Jan. 17, 1933.    R. KARASINSKI    1,894,771
PISTON
Filed April 16, 1927    2 Sheets-Sheet 1
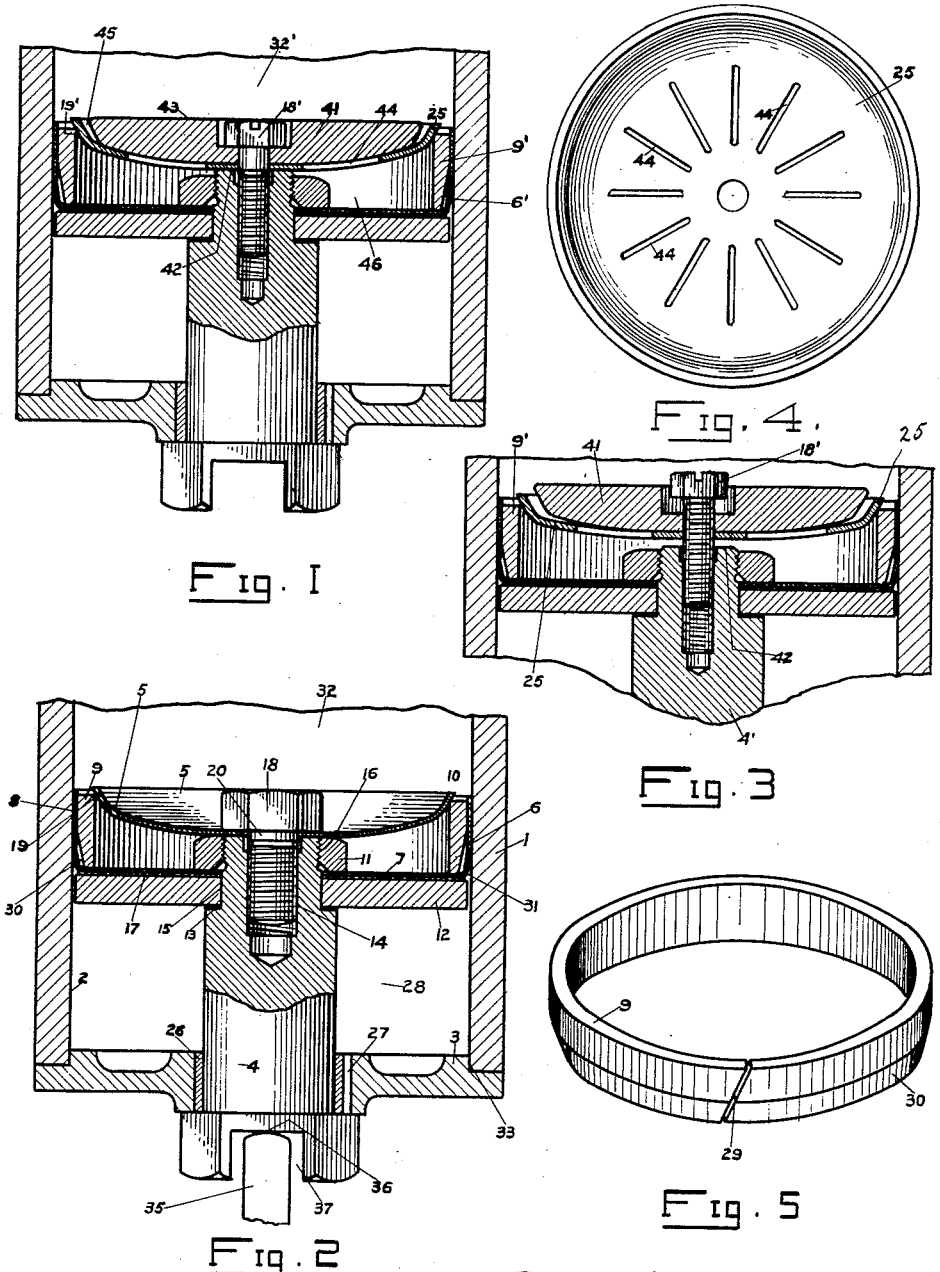

Jan. 17, 1933.　　　R. KARASINSKI　　　1,894,771
PISTON
Filed April 16, 1927　　2 Sheets-Sheet 2

Inventor
Romuald Karasinski.
By Frank M. Slough
His Attorney.

Patented Jan. 17, 1933

1,894,771

UNITED STATES PATENT OFFICE

ROMUALD KARASINSKI, OF CLEVELAND, OHIO, ASSIGNOR TO THE GUARDIAN TRUST COMPANY, OF CLEVELAND, OHIO, A CORPORATION OF OHIO

PISTON

Application filed April 16, 1927. Serial No. 184,224.

My invention relates to pistons and relates particularly to pistons adaptable for use in cylinders of automotive brakes, rams, or other mechanisms wherein it is highly important to effect a good fluid seal between the piston and the walls of the cylinder in which the piston is adapted to be reciprocated.

An object of my invention is to provide a piston in which a very highly efficient seal is maintained between the peripheral walls of the piston adjacent its head and the cylinder walls with a minimum of friction between the piston and cylinder walls.

Another object if my invention is to provide a piston adapted to reciprocate within a cylinder and to effect a good seal between the sealing surfaces of the piston and cylinder walls with varying degrees of friction and in which the frictional resistance of the contact between the piston and cylinder walls will be lessened on a non-working stroke of the piston.

Another object of my invention is to provide a piston capable of effecting a good seal between the piston and the walls of the cylinder comprising a minimum of parts which may be produced and assembled in quantities at a low cost.

Another object of my invention is to provide a piston which will be effective in operation to accomplish a good seal between the piston and the walls of the cylinder to prevent the loss of fluid from the chamber of a cylinder in which the piston is placed during non-working periods of the piston and to prevent lubricant from passing the piston along the cylinder walls to an objectional degree at any time.

Other objects of my invention and the invention itself will be apparent by reference to the following description of certain embodiments of my invention and in which description, reference will be had to the accompanying drawings illustrating the said embodiments.

Referring to the drawings:

Fig. 1 illustrates an embodiment of my invention disposed within a cylinder, a fragment of which only is shown in longitudinal medial sectional view;

Fig. 2 is a similar view of a second embodiment of my invention;

Fig. 3 is a fragment of a view similar to Fig. 1 but with certain of the parts only partially advanced to assembled position relative to the other parts;

Fig. 4 is a plan view of resilient disk employed in the embodiment of Figs. 1 and 3;

Fig. 5 is a perspective view of an expanding ring element of the embodiment of Figs. 1, 2 and 3;

Figure 9:
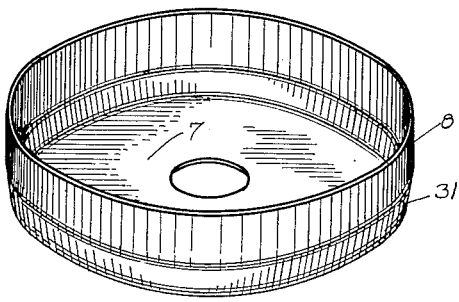
Fig. 9 is a view of a sealing element.

Referring now first to the embodiment of my invention illustrated in Fig. 2, at 1, I show a cylinder having inner side wall surfaces 2 and an end wall 3 and into which cylinder a piston comprising a stem 4 and a head 5 is adapted to reciprocate, the piston comprises also substantially cup-shaped sealing element 6, Fig. 9, having an end wall 7 and sealing side wall portions 8 and an expanding ring 9 for the side walls interposed between the inner surfaces of the side wall sealing portions 8, the end wall 7 and an intraperipheral portion of the convex surface of the said element 5. The head element 5 is preferably of dished form and of relatively thin resilient metallic material, such as Swedish clock spring steel, and in its portion adapted for engagement with the ring 9 adjacent its rim, it is formed in all radial sections, such as illustrated in Fig. 2, as a segment with its faces preferably as arcs of a circle, so that should tilting of the dished element 5 occur, the positions of the outer convex surfaces thereof adjacent the rim 10 will be formed as an annular zone of a hollow sphere, so that a good seating contact will be had nevertheless between such surfaces and the circular upper inner edge of the rim 9 and engageable therewith.

The cup 6 is preferably constructed of metallic sheet material which although possessing the property of ductility to some extent still is sufficiently resilient as to return to its normal unstressed form after being stretched circumferentially by the expanding effect of the ring 9, as will be later described, and in order to exert a sufficiently retractive action upon the ring 9 to contract the same after being previously expanded thereby. The piston stem 4 is reduced at 15 and exteriorly threaded at 16 with an interior threaded axial recess 14 extending into it from its upper end, the reduction in its diameter at 15 providing a shoulder 13 upon which a disk 12 may be seated and against which it may be clamped by a clamping nut 11, advanced onto the threads 16 of the stem and clamping the interposed inner portion of the pierced end wall 7 of the sealing cup element, an apertured gasket 17 is interposed between the end wall 7 of the sealing cup and the disk 12 securely on the stem.

A machine screw 18 is screw threaded through an axial opening in the dished piston head 5 and screw threaded into recesses 14 of the piston stem in order to clamp the head element 5 upon the end of the stem. Prior to securing the head element 5 on the end of the stem, as described, and the gasket 17 and cup 6 being put into place over the disk 12 and secured thereto by nut 11, the ring 9, which is more completely illustrated in Fig. 5, is placed within the inner walls of the cup and rested on its bottom wall by its reduced end. Then the head element 5 is rested on the inner edge 19 of the rim 9 and after being centered is clamped onto the end of the stem 4 by the machine screw 18, projected through the central opening of the head element 5, a neck portion 20 of the machine screw 18 intermediate its threads and head being provided of such a size as to loosely fit within the central opening in the head element 5 so as to insure proper centering of the head element relative to the axis of the stem.

The head element 5, just as is the case with the head element 25 of Fig. 1 as will be hereinafter more particularly related, is before assembly dished to a lesser depth than that shown in Fig. 2 since it is supported near its rim by the inner edge 19 of the ring which though forced to expand, yet resists expansion and the center of the element 5 is therefore drawn down onto the end of the stem 4 by the head of the machine screw 18. This will effect a deeper dishing of the head element 5 in opposition to its normal tendency to remain in its less dished form, and against the power of the inherent resiliency of the material of which the head element is made. By consequence of its resistance to deformation and by virtue of its normal form the face of resistance to deformation effects a pressure upon the ring 9 in a downward and outward oblique direction, substantially equal at all points of contact with the ring 9 to put the ring under an expanding stress.

The piston stem 4 is provided with a bearing 26 disposed within the axial opening of the cylinder end wall 3, an air relief passage 27 being provided through the said end wall adjacent such bearing for relief and admission of air from and to the space 28 within the cylinder 1 between the cylinder end wall 3 and the piston disk 12 so that movements of the piston will be substantially unimpeded by trapped air in this space. The expanding ring 9 is adapted for communication of expanding pressure from the outer convex surface of the spring head element 5 to the interior side wall surface of the cup 6, and, as illustrated in Fig. 5, is split at 29 at at least one portion of its length to facilitate expansion of the ring and provide fluid communicating passages longitudinal of the ring through the ring. The outer surface of the ring is relieved in the portion of such surface most nearly disposed to the end wall 7 of the metallic cup 6, such relieved ring being indicated in Figs. 2 and 5 at 30.

The cup 6 comprises in its side wall concentric annular joined portions 8 and 31. The portion 31 is inclined relative to the substantially cylindrical portion 8 to a degree that effects a spacing between the cup portion 31 and the opposing surface 30 of the ring 9 and the adjacent surfaces of the cylinder side walls.

In practice the piston of the embodiment of my invention illustrated in Fig. 2, operates as follows, it being assumed that the piston is inserted within a cylinder 1 of a fluid operated brake mechanism or like fluid pressure operated mechanism, the parts being constructed, assembled and disposed within the cylinder, as above described, and fluid under pressure being admitted to the pressure chamber 32, the pressure of such fluid will be exerted according to the area of surface pressed thereto by the head element 5, the top surface of the ring element 9 and the rim portion of the cup element 31. This pressure will largely be exerted upon the head element 5 and its center, being securely anchored by the clamping screw over the piston stem, it will yield to the pressure exerted upon its concave surface only in portions for its rim 10 and the effect of the pressure will therefore tend to flatten the dished resilient head 5, the flattening being meanwhile resisted by the split ring 9 which is encompassed by, and restrained from expansion by, the lateral wall portions 8 of the sealing cup 6.

Prior to the exertion of fluid pressure upon the head element 5 the wall portions 8 of the sealing cup are previously put under tensile stress effecting a strain of the side wall portions within the elastic limit of the material comprised in such side wall portions, the side wall portions being thus expanded in diametrical dimensions in all directions substantially equally to effect a tight seal between the walls of the cylinder and the cup side wall portions 8. This stress and strain is increased to a degree commensurable with the effect of fluid pressure added to the spring pressure communicated by the head to the ring to the end that a tighter seal will be had between the contacting portions of the side walls of the cup 6 and the cylinder wall and between the contacting portions of the ring 9 engaging with the head 5 and other portions engaging with the inner surface of the cup side wall. The piston will be bodily moved longitudinally in the cylinder in a direction away from the pressure chamber 32, the stem 4 sliding within its bearing 26, meanwhile, the bearing is concentric with the surface 33 of the cylinder and therefore prevents tilting of the stem relative to the cylinder.

The longitudinal movement of the piston is resisted by the brake lever arm 35 which engages the piston stem at the surface 36 provided by the slot 37. The air space 28 meanwhile will be forced therefrom through the passages 27, of which one only is shown, others may be provided.

The resistance offered to the movement of the piston by the lever 35 which, incidentally, will operate suitable brake or other mechanism, will be effective to cause further flattening of the steel dished head 5 by movement of its outer portions toward the plane of its central portion, the movement, however, being directed at the same time outwardly against the edge 19 of the expanding ring 9. As more resistance is offered by the lever 35 during a period wherein fluid under pressure is contained in the space 32 to move the piston axially of the cylinder, more expanding pressure will be exerted by the expanding surface of the head 5 upon the ring 9 to effect sealing between the contacting surfaces of the sealing cup and the cylinder to a degree commensurable with the resistance offered and the pressure exerted.

After the pressure is relieved by the operator shutting off the source of pressure relieving the pressure in the cylinder chamber 32 by discharging fluid from such space, in the well known manner by operating a suitable valve for the purpose, the parts will be restored substantially to the relative position shown in Fig. 2, the fluid pressure being first relieved permits the lever 35 which is spring pressed for non-braking position, to reciprocate the piston to its illustrated position, the reduced pressure in the space 32 likewise effecting the restoration of the head spring cup element 5 to its form illustrated wherein it is dished relatively more than in fully operated braking position of the piston and permitting the contraction of the sealing portion 8 of the sealing cup side walls to contract the ring 9 interposed between the nested cups 5 and 6. The form given the head 5, its elastic nature and the relative disposition of the contacting surfaces of the element 5, the ring 9 and cup 6 permit ready contraction of these portions upon fluid pressure being relieved in the pressure chamber and, therefore, the return of the piston to the normal position by power of the retractile elements comprised in the brake mechanism having the lever 35 will be facilitated, the frictional contact had with the walls of the cylinder being much reduced.

Referring now to the embodiment of my invention illustrated in Figs. 1, 3, and 4 and which embodiment also employs a ring as illustrated in Fig. 5, the description heretofore made as to the mode of operation pertaining to the embodiment of Figs. 2 and 5 will also apply to this second embodiment. Referring to this second embodiment of Figs. 1, 3 and 4, Fig. 3 illustrates the parts partially assembled with the dished spring head element 25 corresponding to the head element 5 of Fig. 2 in non-stressed condition being placed in position to be clamped upon the end surface 42 of the piston stem 4' by the clamping disk 41 whenever the clamping screw 18' is advanced to its home position, it being illustrated ready to be so advanced in Fig. 3 and being illustrated in Fig. 1 as fully advanced to assembled home position. The dished spring head 25, like the head 5 of Fig. 2, is in its unstressed form shallower than when clamped onto the end of the piston and while its rim portion is supported by the expanding ring as previously described in connection with the element 5.

In the embodiment of Fig. 1, the space within the dished head 25 is largely occupied by the solid metallic disk 41 which has a convex contacting face and largely in engagement with the concave face of the dished head and which has a substantially flat outer surface 43. The disk 41 when advanced to the position shown in Fig. 1 accomplishes the closing of the elongated openings 44 against the flow of fluid from the compression chamber 32' for all except excessive pressures existing in such compression chamber. By providing the disk with a plurality of radially extending longitudinal openings extending throughout, a thicker disk may be employed which will flex to an equal degree to that which could be accomplished by a thinner disk without such openings and by providing the openings and the head 41 to substantially close them against ordinary fluid pressures, a thicker disk which may be more easily manufactured to uniform specifications and which will be more uniformly responsive may be employed.

In operation the piston of Fig. 1 will operate in the same manner as Fig. 2, except that the piston of Fig. 1 when operated under the condition of fluid pressure in the pressure chamber 32' which would otherwise exert so great a pressure upon the dished head element 25 as to collapse the same beyond the elastic limit of the material, the provision of the normally closed passages 44 and the admission of fluid from the chamber 32' to the upper surface of this disk through the annular passage 45 adjacent its rim permits fluid pressure applied through such passage on the concave surface of the disk, beyond a predetermined pressure to bow the disk portions intermediate the ring 9' and the seat 42 to operate such portions from the contacting surface of the disk 41 whereby fluid under pressure will pass between the thus operated surface of spring head element 45 and disk 41 through the passages 44 into the space 46 between the spring head element and the interior of the sealing cup 6'. Thus the passages 44 upon abnormal fluid pressures comprise relief valve openings effective to tend to equalize the pressures on the two faces of the spring head 25 upon abnormal pressure conditions only.

Subsequent to such abnormal pressure conditions when the pressure in the pressure chamber 32' is relieved the abnormal pressure attained in the space 46 will be relieved by possibly at first the escape of fluid under such abnormal pressure between the otherwise contacting surfaces of the rim portion of the head element 25 and the inner contacting edge 19' of the ring 9' and will be more completely relieved by the control of fluid under such high pressure from the space 46 through the passage provided between the split operated portions of the ring 9' as at 29 of Fig. 5. By providing the combination of elements affording a check valve in the head of the piston which, as illustrated herein, comprises elements 41 and 25, the piston of my invention may be employed where abnormally high fluid pressures may be encountered and without danger of straining any of the parts beyond their elastic limit and their capacity to function properly as intended.

Figure 7:
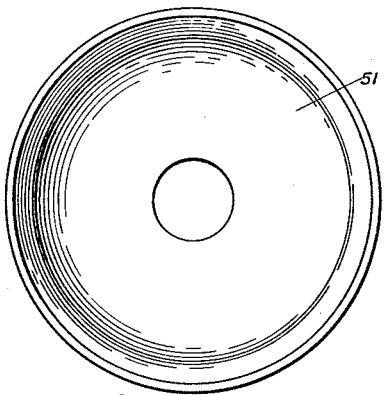
Fig. 7 is a plan view of a resilient disk as employed in the embodiment of Fig. 6.
Figure 8:
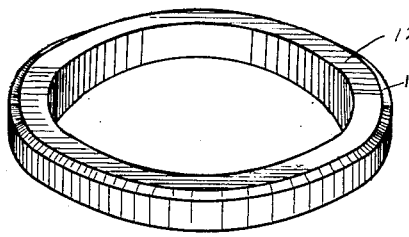
Fig. 8 is a view of a ring.

Referring now to the embodiment of my invention illustrated in Figs. 7 to 11, inclusive, this embodiment is in structure and mode of operation like that of Fig. 2, with the exception that the ring 9 of Fig. 2, in the present embodiment shown at 90, is provided with an upper inner edge 190 and a lower inner edge 191 engageable with inclined surfaces, one of which being the contacting surface 52 of the spring head element 51, Fig. 7, and the inclined surface being a beveled edge surface 111 of a ring 12' which rests slidably onto the end wall 7' of the sealing cup element 60, in this embodiment the parts of the piston are held together by an enlarged clamping nut 118 having tool receiving openings 119 to permit the reception of tool prongs for the purpose of tightly turning the clamping element 118 onto the threaded end 12 of the piston stem 104. The piston stem is provided with a shoulder upon which a gasket 113 may be placed and upon which is seated the superposed disk 120, gasket 117, sealing cup end wall 7', disk 11' and spring head element 51 and clamped by the clamping nut 118, concentric with the disk 11' is the ring 12' held in place by the expansion ring 90.

Figure 10:
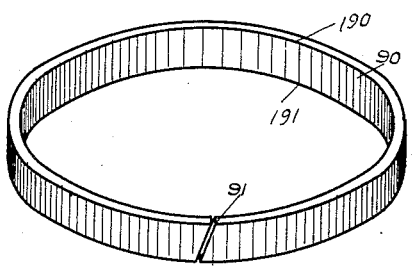
Fig. 10 is a view of an expanding ring, all in perspective, employed in the embodiment of Fig. 6, the sealing element of Fig. 9 being as employed also in the other embodiments.
Figure 11:
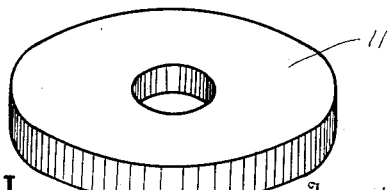
Fig. 11 is a view of a clamping disk.

The expansion ring 90 is as illustrated in Fig. 10 substantially cylindrical in form and is split at 91 similar to the rings 9 and 9' of the previously described embodiments, but which, unlike such embodiments, is not provided with a reduced end portion 30 since at its lower inner edge in the present embodiment the ring rests upon an outward inclined upper beveled edge 111 of the disk 11'.

Figure 6:
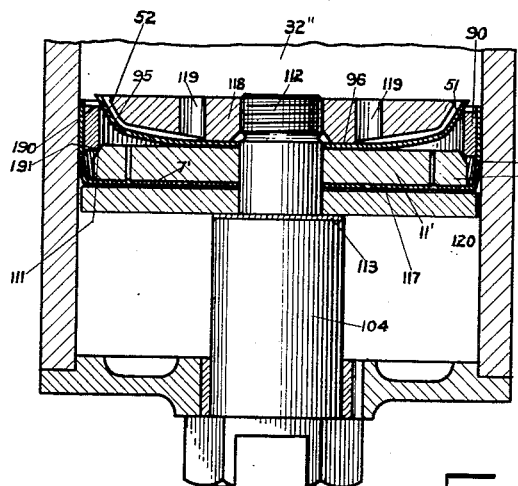
Fig. 6 is a view similar to that of Fig. 1, of a third embodiment of my invention.

The provision of the outwardly inclined surface of the spring head 51 and ring 12', contacting with the inner edges of the ring 90, when pressure is applied to the spring head 51 and flowing to all portions of its outer exposed surface through passages 119 and the annular passage 95 intermediate the elements 118 and 51, will be to expand the ring 90 responsive to the effected movement of the spring head 51 in its non-clamped outer portions toward flattened condition of the head, as described for the head 5 of the first embodiment. The clamping element 118 is relieved from contact with the dished spring head 51 except along an annular surface 96 adjacent the reduced threaded end 112 of the piston stem where clamping of the spring head occurs. This portion of the spring head being thus made rigid and integral with those portions of the piston head 120, 11' and 118 which are relatively immovable. From the foregoing description of the mode of operation of the embodiment of Fig. 2, the action of the piston of Fig. 6 will now be understood, it being understood meanwhile that the greater volume of the element 118 disposed within the dished head 51 over the volume of the head of the clamping screw 18 of Fig. 2 permits an increased saving of operating fluid in the embodiment of Fig. 6.

In both of these embodiments and in the embodiment of Fig. 1 upon the pressure of fluid in the cylinder chamber 32, 32" or 32', as the case may be for the different embodiments, fluid under pressure which during the pressure period was admitted to the space intermediate the nested cup elements comprising the sealing cup and the spring head element, through the passages formed by the split operated portions 29 or 91, as the case may be, of the expanding ring, or otherwise, may escape sometimes by "blowing through" the adjacent surface of the spring element and the expanding ring and in addition will always escape by loss of pressure through the passage provided by the split operated portions of the expansion ring.

In the different embodiments of my invention the sealing cup element will be made of a material having considerable ductility to enable its outer surface to conform with the true form of the cylinder walls and yet must have a sufficient amount of elasticity so that when expanded against the cylinder walls by pressure exerted by the expanding ring upon its inner walls, it may return to a relatively less expanding form upon the expanding pressure being relieved. An alloy composition for the sealing cup giving excellent results is one comprising 92 per cent copper and 8 per cent aluminum. The material of the rings 9, 9' and 90 may vary but excellent results may be secured when such ring is made of cast iron or cast steel. Although these rings may be of various dimensions, good results may be had where the thickness is .040" to .067" for certain conditions of use commonly had in connection with devices of this kind. The spring head elements 5, 25 and 51 may be varied in structural composition; when made of Swedish clock steel properly tempered excellent results may be secured when proper precautions are taken to prevent rusting of the steel.

Having thus described my invention in a specific construction and having described what I now believe to be the mode of operation thereof, but without an intention to be limited by the recitation of such mode of operation, should it later be discovered that the mode of operation is different in some respects from that described, and being aware that numerous and extensive departures may be made from the embodiment herein illustrated and described but without departing from the spirit of my invention.

I claim:

1. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring.

2. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring, said disk of normal concavo convex form substantially nested within said ring.

3. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring, an end wall closure of substantially disk form for said ring, said ring comprising an inwardly inclined end portion integrally joined with said closure portion.

4. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring, an end wall closure of substantially disk form for said ring, said ring comprising an inwardly inclined end portion integrally joined with said closure portion, said disk of normal concavo-convex form substantially nested within said ring.

5. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring, an end wall closure of substantially disk form for said ring, said ring comprising an inwardly inclined end portion integrally joined with said closure portion, and means to communicate the pressure of said disk to said ring comprising outwardly movable annularly disposed rigid means engageable with a longitudinal intermediate annular portion of the inner surface of said ring and interiorly with an inclined surface of said disk.

6. In a piston, packing means therefor including a thin circumferentially extensible sheet metal cylinder wall engaging ring, a piston body, and means to secure said ring on a head portion thereof, and expanding means therefor including an inherently resilient disk of sheet metal, and means for securing said disk by an intermediate portion to said piston head effecting deformation of said ring to communicate outwardly directed pressure against annular longitudinally intermediate portions only of said ring, an end wall closure of substantially disk form for said ring, said ring comprising an inwardly inclined end portion integrally joined with said closure portion, said disk of normal concavo-convex form substantially nested within said ring, and means to communicate the pressure of said disk to said ring comprising outwardly movable annularly disposed rigid means engageable with a longitudinal intermediate annular portion of the inner surface of said ring and interiorly with an inclined surface of said disk.

In testimony whereof I hereunto affix my signature this 8th day of February, 1927.

ROMUALD KARASINSKI.